(12) United States Patent
Mori et al.

(10) Patent No.: US 7,848,208 B2
(45) Date of Patent: Dec. 7, 2010

(54) OPTICAL HEAD DEVICE, ABERRATION CORRECTION METHOD AND OPTICAL INFORMATION PROCESSING APPARATUS

(75) Inventors: Eishin Mori, Kyoto (JP); Hideki Aikoh, Osaka (JP); Joji Anzai, Osaka (JP); Kousei Sano, Osaka (JP)

(73) Assignee: Panasonic Corporation, Osaka (JP)

( * ) Notice: Subject to any disclaimer, the term of this patent is extended or adjusted under 35 U.S.C. 154(b) by 522 days.

(21) Appl. No.: 11/905,927

(22) Filed: Oct. 5, 2007

(65) Prior Publication Data
US 2008/0084809 A1   Apr. 10, 2008

(30) Foreign Application Priority Data
Oct. 5, 2006  (JP) .............................. 2006-273819

(51) Int. Cl.
*G11B 7/00* (2006.01)
(52) U.S. Cl. .............................. 369/112.08; 369/112.05
(58) Field of Classification Search ........................ None
See application file for complete search history.

(56) References Cited

U.S. PATENT DOCUMENTS

2005/0105436 A1*  5/2005  Tsai .......................... 369/53.37

2005/0157623 A1*  7/2005  Itonaga ................... 369/112.05

FOREIGN PATENT DOCUMENTS

| JP | 2001-108894 | 4/2001 |
|----|-------------|--------|
| JP | 2001-256672 | 9/2001 |
| JP | 2002-82280  | 3/2002 |

* cited by examiner

*Primary Examiner*—Joseph H Feild
*Assistant Examiner*—Tawfik Goma
(74) *Attorney, Agent, or Firm*—Wenderoth, Lind & Ponack, L.L.P.

(57) ABSTRACT

An optical head device is provided with a semiconductor laser, an aberration correcting element for transmitting a beam from the semiconductor laser, a light guiding portion for introducing the beam from the semiconductor laser to the aberration correcting element, and an objective lens for focusing the beam having passed through the aberration correcting element on an optical disc. The aberration correcting element corrects a longitudinal chromatic aberration occurring in the objective lens and a longitudinal chromatic aberration occurring in the light guiding portion excluding the objective lens and the aberration correcting element based on a longitudinal chromatic aberration occurring in the aberration correcting element when the semiconductor laser emits a beam having a wavelength different by a specified wavelength difference.

Therefore, an optical head device, an aberration correction method and an optical information processing apparatus can be provided which can suppress a longitudinal chromatic aberration occurring in the entire optical system from a light source to an objective lens.

8 Claims, 8 Drawing Sheets

OPTICAL HEAD DEVICE, ABERRATION CORRECTION METHOD AND OPTICAL INFORMATION PROCESSING APPARATUS

BACKGROUND OF THE INVENTION

1. Field of the Invention

The present invention relates to an optical head device for recording and/or reproducing an information signal on and/or from an information recording medium, an aberration correction method of an aberration correcting element used in such an optical head device and an optical information processing apparatus provided with such an optical head device.

2. Description of the Background Art

High-density and high-capacity optical information recording media include optical discs such as DVDs and Blu-Ray discs (hereinafter, abbreviated as "BDs"). Such optical discs are recently rapidly growing popular as recording media for recording images, music and computer data.

As optical disc capacities increase, the wavelengths of light sources for optical head devices are becoming shorter and the apertures of objective lens are becoming larger. Since the dispersion of an optical material such as a lens element is very high in a short wavelength region, the refractive index of the optical material largely changes upon a slight change in the wavelength of a beam. Accordingly, it has been necessary to consider a correction of chromatic aberration in optical head devices of recent years.

Here, since a laser power is generally higher at the time of recording information than at the time of reproducing information in an optical head device, a phenomenon of momentarily varying a central wavelength by several nm due to an output change upon the switch from the reproduction to the recording might occur in some cases. A defocus error that occurs due to this phenomenon can be eliminated by focusing an objective lens. Unless the chromatic aberration of the objective lens is not corrected, problems such as a recording failure caused by the defocus error occur during a period of several nsec until the objective lens is focused. Since the longitudinal chromatic aberration of the objective lens increases as the wavelength of the light source of a beam passing through the objective lens becomes shorter, deterioration in wavefront aberration resulting from this phenomenon tends to increase as the light source wavelength becomes shorter. For the above reason, it can be said that the longitudinal chromatic aberration needs to be corrected particularly in an optical head device using a blue violet semiconductor laser as a light source.

A diffraction element utilizing a diffraction action is known as an element for correcting the longitudinal chromatic aberration of an objective lens with a simple construction. Optical head devices using a blue violet semiconductor laser and including a diffraction element for correcting the longitudinal chromatic aberration of an objective lens are disclosed in Japanese Unexamined Patent Publication Nos. 2001-256672 (prior art 1), No. 2001-108894 (prior art 2) and No. 2002-082280 (prior art 3) described below.

The optical head device disclosed in the above prior art 1 is designed to correct the longitudinal chromatic aberration of an objective lens by a diffraction element arranged in a parallel beam between a blue-violet semiconductor laser light source and the objective lens. The optical head device disclosed in the above prior art 2 is designed to correct the longitudinal chromatic aberration of an objective lens by the action of a diffraction structure on an optical surface of a collimator lens for converting a divergent beam from a blue-violet semiconductor laser light source into a parallel beam and introducing the parallel beam to an objective lens. Further, the optical head device disclosed in the above prior art 3 is designed to correct the longitudinal chromatic aberration of an objective lens by the action of a diffraction structure on an optical surface of an expander lens arranged in a parallel beam between a blue-violet semiconductor laser light source and the objective lens.

In the conventional optical head devices, a beam emerging from a chromatic aberration correcting element toward the objective lens becomes a convergent beam if the wavelength of the semiconductor laser changes in such a direction as to become longer than the designed wavelength of an optical system for the optical head device by the action of the diffraction structure. Further, if the wavelength of the semiconductor laser changes in such a direction as to become shorter than the designed wavelength of the optical system for the optical head device, a beam emerging from the chromatic aberration correcting element toward the objective lens becomes a divergent beam. The longitudinal chromatic aberration of the objective lens can be corrected utilizing this characteristic. If the degree of divergence of the beam propagating toward the objective lens changes in this way as the wavelength of the semiconductor laser changes, the magnification of the objective lens changes, wherefore spherical aberration occurs.

Semiconductor lasers used as light sources in optical head devices have wavelength differences of about ±10 nm from laser to laser by manufacturing errors. If a semiconductor laser whose wavelength is deviated from the designed wavelength of the optical system for the optical head device is used in the above optical head devices, the spherical aberration occurring as the magnification of the objective lens changes is eliminated. Thus, it is necessary to initially adjust the position of the collimator lens and that of the semiconductor laser, which increases the production cost of the optical head device.

Particularly, the above problem tends to become more obvious by using a single objective lens having a large numerical aperture as a general method for reducing the cost of the optical head device and making the construction of the optical head device compact. With the single lens, the spherical aberration when the wavelength of an incident light changes (hereinafter, called "spherical chromatic aberration") increases in proportion to the fourth power of the numerical aperture. Thus, it is necessary to correct the spherical chromatic aberration remaining in the objective lens itself in addition to the spherical aberration change resulting from the change in the magnification of the objective lens during the initial adjustments of the position of the collimator lens and that of the semiconductor laser. In order to realize the use of the single objective lens having a large numerical aperture, it is preferable to use a highly refractive material to ensure a margin for optical axis deviations of optical surfaces.

However, since a highly refractive material is generally highly dispersed, an amount of the longitudinal chromatic aberration to be corrected by the chromatic aberration correcting element tends to increase. Thus, in order to correct the longitudinal chromatic aberration of the objective lens made of such a highly refractive material, the degree of divergence of a beam propagating from the chromatic aberration correcting element toward the objective lens, which results from the wavelength change of the semiconductor laser, needs to be set large. As a result, a change in the magnification of the objective lens increases in the case of using a semiconductor laser whose wavelength is deviated from the designed wavelength of the optical head device. Thus, the spherical aberration increases as the magnification of the objective lens changes, and amounts of initial adjustments of the position of the collimator lens and that of the semiconductor laser increase.

As a solution to such a problem, the spherical aberration occurring as the magnification of the above objective lens changes can be canceled by designing the chromatic aberration correcting element such that the spherical aberration changes if the wavelength of the semiconductor laser changes.

However, there is a likelihood that if the optical axis is deviated by the tracking drive for the objective lens, nonnegligible magnification chromatic aberration occurs by a wavelength change caused by the power variation from the reproduction to the recording and, therefore, no good tracking characteristic can be obtained, which might cause a recording or reproduction failure.

Further, the longitudinal chromatic aberration of only the objective lens has been corrected by the chromatic aberration correcting element in the conventional optical head devices. For example, CDs and DVDs are made up of at most two information recording layers, and it is sufficient for a laser beam from the light source to have a low power if the number of information recording layers is small. Thus, the longitudinal chromatic aberration by the optical system other than the objective lens was negligible amounts.

Contrary to this, with the advent of BDs in recent years, optical discs tend to have higher speeds and more layers. By the speeding up and higher stratification of optical discs, laser beams from light sources are required to have higher powers. In such a case, the wavelength of the light source varies by several nm or more at the time of the switch from the reproduction to the recording. Thus, the amount of the longitudinal chromatic aberration by the optical system other than the objective lens becomes nonnegligible, making it difficult to suppress the longitudinal chromatic aberration of the entire optical system from the light source to the objective lens.

SUMMARY OF THE INVENTION

In view of the problems residing in the prior art, an object of the present invention is to provide an optical head device, an aberration correction method and an optical information processing apparatus capable of suppressing the longitudinal chromatic aberration occurring in the entire optical system from a light source to an objective lens.

One aspect of the present invention is directed to an optical head device, comprising a light source; an aberration correcting element for transmitting a beam from the light source; a light guiding portion for introducing the beam from the light source to the aberration correcting element; and an objective lens for focusing the beam having passed through the aberration correcting element on an optical information recording medium, wherein the aberration correcting element corrects a longitudinal chromatic aberration occurring in the objective lens and a longitudinal chromatic aberration occurring in the light guiding portion excluding the objective lens and the aberration correcting element based on a longitudinal chromatic aberration occurring in the aberration correcting element when the light source emits a beam having a wavelength different by a specified wavelength difference.

Another aspect of the present invention is directed to an aberration correction method of an aberration correcting element used in the above optical head device, characterized in that a longitudinal chromatic aberration $\Delta fb\_obj$ occurring in an objective lens and a longitudinal chromatic aberration $\Delta fb\_opt\text{-}obj\text{-}ca$ occurring in a light guiding portion excluding the objective lens and the aberration correcting element when a light source emits a beam having a wavelength different by a specified wavelength difference are determined; and a longitudinal chromatic aberration $\Delta fb\_ca$ occurring in the aberration correcting element is so determined as to satisfy a condition defined by equation (1):

$$(|\Delta fb\_obj| + |\Delta fb\_opt\text{-}obj\text{-}ca|) = |\Delta fb\_ca| \qquad (1).$$

Still another aspect of the present invention is directed to an aberration correction method of an aberration correcting element used in the above optical head device, characterized in that a longitudinal chromatic aberration $\Delta fb\_obj$ occurring in the objective lens, a longitudinal chromatic aberration $\Delta fb\_opt\text{-}obj\text{-}ca$ occurring in the light guiding portion excluding the objective lens and the aberration correcting element, an average power $LD\_p$ of a light source at the time of recording and a wavelength variation $\Delta\lambda/\Delta LD\_p$ caused by a power variation of the light source when the light source emits a beam having a wavelength different by a specified wavelength difference are determined; and a longitudinal chromatic aberration $\Delta fb\_ca$ occurring in the aberration correcting element is so determined as to satisfy a condition defined by equation (2):

$$(|\Delta fb\_obj| + |\Delta fb\_opt\text{-}obj\text{-}ca|) - |0.16|/(LD\_p \times \Delta\lambda/\Delta LD\_p) \leq |\Delta fb\_ca| \qquad (2).$$

Further another aspect of the present invention is directed to an optical information processing apparatus for recording and/or reproducing an information signal on and/or from an optical information recording medium, comprising a rotating device for rotating the optical information recording medium; an optical head device, which is the above optical head device and further includes a light receiving element for receiving a beam, which was reflected by the optical information recording medium and passed through the objective lens, and converting the received beam into an electrical signal corresponding to an amount of the beam and an actuator for driving the objective lens at least in a radial direction relative to an information track of the optical information recording medium; and a controller for controllably driving the rotating device and controllably driving the actuator of the optical head device in accordance with the electrical signal received from the light receiving element of the optical head device to perform a focusing control and a tracking control for the optical information recording medium.

DETAILED DESCRIPTION OF THE PREFERRED EMBODIMENTS OF THE INVENTION

Figure 1:
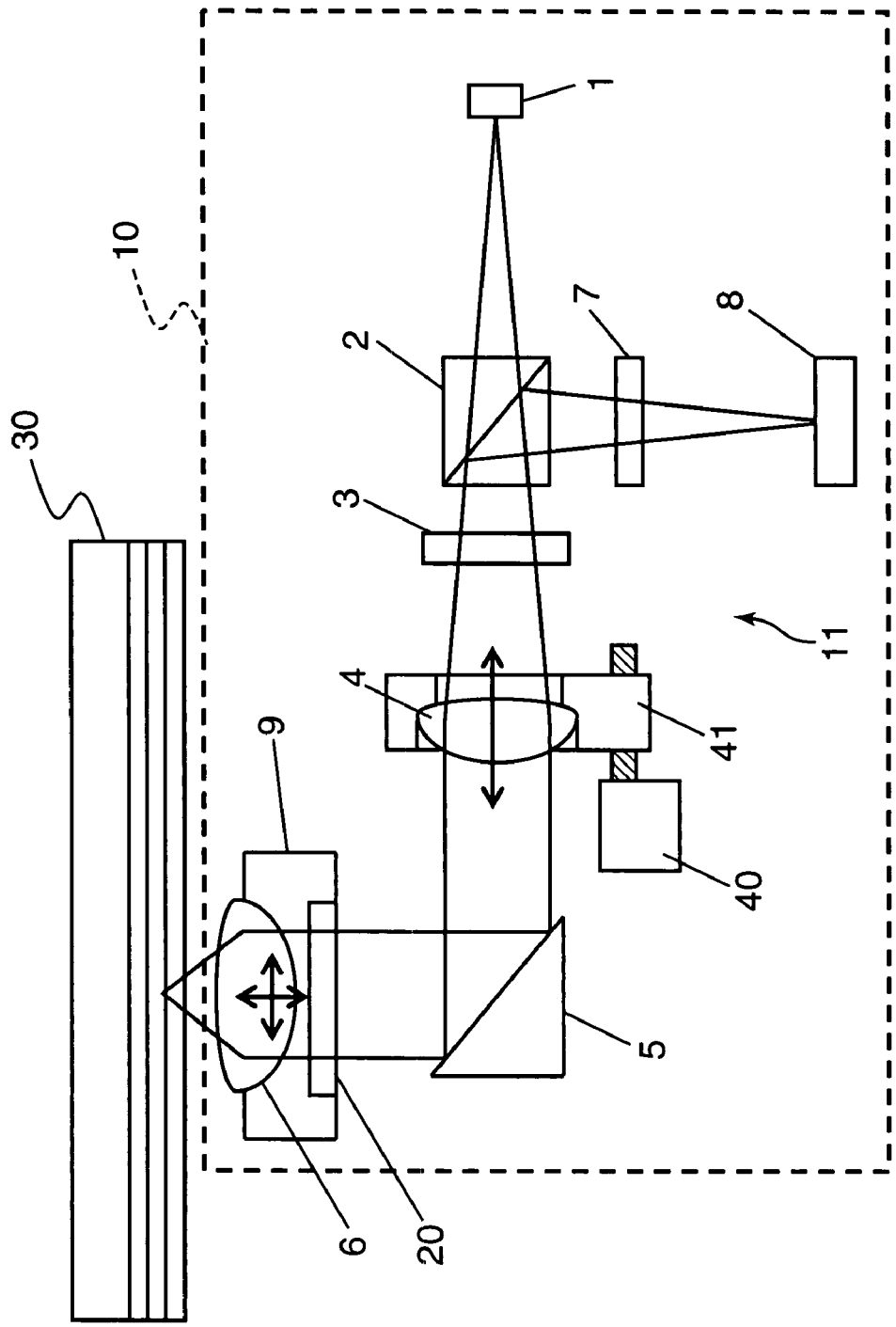
FIG. 1 is a schematic construction diagram of an optical head device according to a first embodiment of the invention.

Hereinafter, embodiments of the present invention are described with reference to the accompanying drawings. It should be appreciated that the following embodiments are specific examples of the present invention and do not limit the technical scope of the present invention. In the respective drawings, component elements having identical constructions or similar functions and operations are identified by the same reference numerals.

First Embodiment

Figure 2:
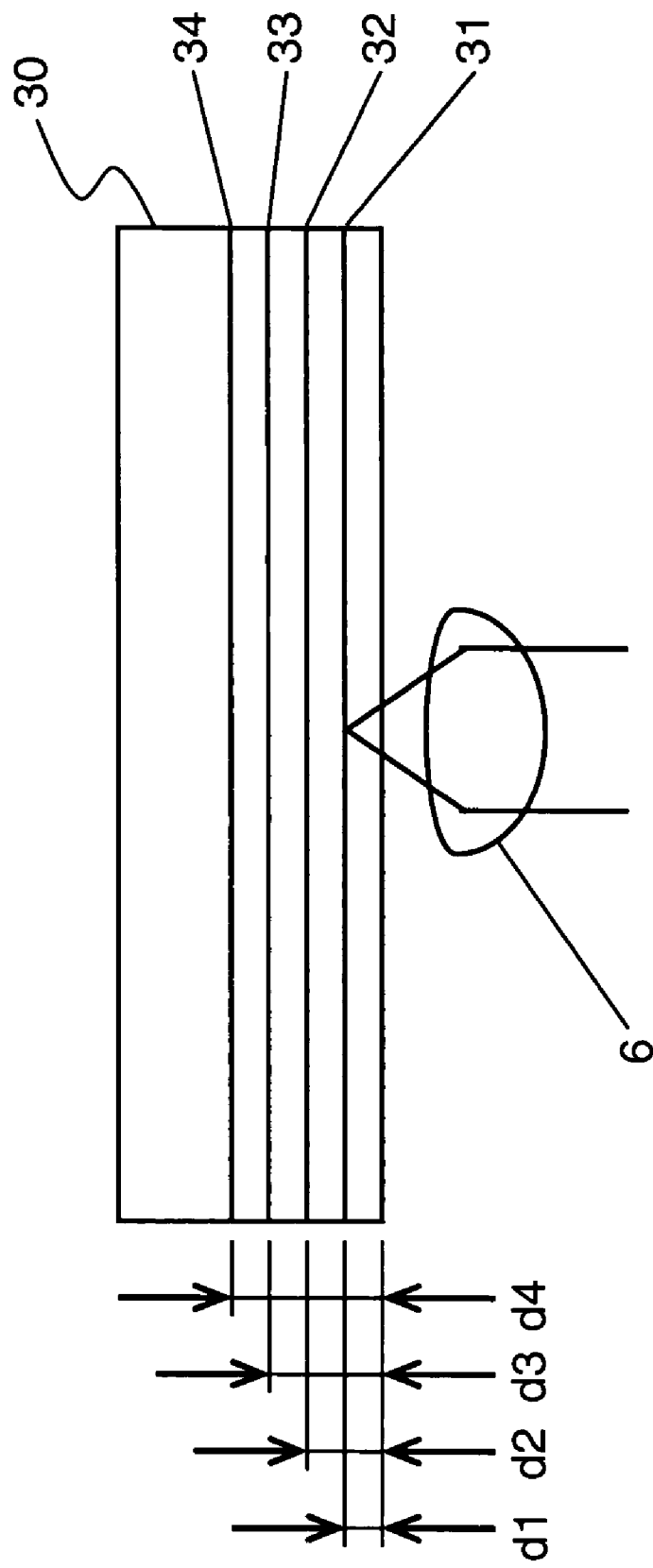
FIG. 2 is a diagram showing the schematic construction of an optical disc in the first embodiment of the invention.

FIG. 1 is a schematic construction diagram of an optical head device according to a first embodiment of the present invention, and FIG. 2 is a diagram showing the schematic construction of an optical disc in the first embodiment of the invention.

In FIG. 1, an optical head device 10 includes a semiconductor laser 1, a beam splitter 2, a quarter-wave plate 3, a collimator lens 4, a reflecting mirror 5, an objective lens 6, a detection lens 7, a light receiving element 8, a biaxial actuator 9, an aberration correcting element 20, a stepping motor 40 and a lens holder 41. Further, a light guiding portion 11 is constructed by the beam splitter 2, the quarter-wave plate 3, the collimator lens 4 and the reflecting mirror 5 to introduce a beam emitted from the semiconductor laser 1 to the aberration correcting element 20.

As shown in FIG. 2, an optical disc (optical information recording medium) 30 having a transparent substrate is formed with four information recording surfaces 31, 32, 33 and 34 in this order from an incident surface side (side toward the objective lens 6), and thicknesses of light transmission layers from the incident surface to the respective information recording surfaces are d1, d2, d3 and d4.

The semiconductor laser 1 emits a blue-violet light beam of, e.g. 408 nm. The beam splitter 2 transmits the light beam emitted from the semiconductor laser 1 and reflects the light beam reflected by the optical disc 30 toward the light receiving element 8. The quarter-wave plate 3 converts the light beam having passed through the beam splitter 2 from a linearly polarized beam into a circularly polarized beam, and converts the light beam reflected by the optical disc 30 from the circularly polarized light into a linearly polarized beam.

The collimator lens 4 converts the light beam converted into the circularly polarized beam by the quarter-wave plate 3 from a divergent beam into a parallel beam, and focuses the light beam reflected by the optical disc 30 on the light receiving element 8. The reflecting mirror 5 reflects the light beam converted into the parallel beam by the collimator lens 4 toward the optical disc 30 and reflects the light beam reflected by the optical disc 30 toward the collimator lens 4.

The objective lens 6 focuses the light beam on a specified information recording surface of the optical disc 30. The detection lens 7 focuses the light beam reflected by the optical disc 30 on the light receiving element 8. The light receiving element 8 photoelectrically converts the received light beam.

The biaxial actuator 9 drives the objective lens 6. The aberration correcting element 20 is constructed, for example, by a diffraction element and corrects a longitudinal chromatic aberration (or axial chromatic aberration) occurring in the objective lens 6 and those occurring in an optical system other than the objective lens 6. Specifically, the aberration correcting element 20 corrects the longitudinal chromatic aberration occurring in the objective lens 6 and the one occurring in the light guiding portion 11 excluding the objective lens 6 and the aberration correcting element 20 based on the longitudinal chromatic aberration occurring in the aberration correcting element 20 when the semiconductor laser 1 emits a beam having a wavelength different by a specified wavelength difference.

It should be noted that the biaxial actuator 9 integrally carries the objective lens 6 and the aberration correcting element 20. The stepping motor 40 drives the collimator lens 4. The lens holder 41 holds the collimator lens 4.

Next, an operation of the optical head device 10 in the case of recording or reproducing information on or from the optical disc 30 is described. A light beam in the form of a linearly polarized beam emitted from the semiconductor laser 1 passes through the beam splitter 2 and is converted into a circularly polarized beam by the quarter-wave plate 3. Thereafter, the light beam converted into the circularly polarized beam is converted into a parallel beam by the collimator lens 4, is reflected by the reflecting mirror 5 and passes through the aberration correcting element 20. The light beam having passed through the aberration correcting element 20 is focused as a light spot on any one of the information recording surfaces 31 to 34 of the optical disc 30 through the transparent substrate.

The light beam reflected by any one of the information recording surfaces 31 to 34 passes through the objective lens 6 and the aberration correcting element 20 and is reflected by the reflecting mirror 5 again. The light beam reflected by the reflecting mirror 5 passes through the collimator lens 4 and is converted into a linearly polarized beam different from the one on the outward journey by the quarter-wave plate 3. Thereafter, the light beam converted into the linearly polarized beam is reflected by the beam splitter 2 and introduced to the light receiving element 8 by the detection lens 7. The light beam detected by the light receiving element 8 is subject to calculation after being photoelectrically converted, thereby generating a focus error signal used to follow a surface fluctuation and a tracking error signal used to follow a deviation. The biaxial actuator 9 drives the objective lens 6 in two axial directions so that the light spot follows an information track of the rotating optical disc 30 in accordance with the focus error signal and the tracking error signal.

The collimator lens 4 is held by the lens holder 41 and is movable along the optical axis of the light beam by the stepping motor 40. Depending on the thickness of the light transmission layer of the information recording surface 31 to 34 or if the thickness of the light transmission layer is deviated from a specified value, the collimator lens 4 converts the light beam into a divergent or convergent beam to correct a spherical aberration resulting from a change in the thickness of the light transmission layer, thereby causing a spherical aberration of an opposite polarity to occur in the objective lens 6 for the correction of the spherical aberration.

Next, specified numerical examples of the respective component elements of the optical head device 10 according to this embodiment are shown.

First, a wavelength λ of the light beam emitted from the semiconductor laser 1 is 408 nm. The thickness d1 of the light transmission layer from the incident surface of the light beam to the information recording surface 31 is 60 μm; the thickness d2 of the light transmission layer from the incident surface of the light beam to the information recording surface 32 is 70 μm; the thickness d3 of the light transmission layer from the incident surface of the light beam to the information recording surface 33 is 87.5 μm; and the thickness d4 of the light transmission layer from the incident surface of the light beam to the information recording surface 34 is 100 μm.

A refractive index n of the light transmission layers of the information recording medium is 1.6. VC 79 produced by Sumita Optical Glass, Inc. and having an Abbe number d of 57.9 is used as the material of the objective lens 6. Further, the objective lens 6 is a single lens having a NA (numerical aperture) of 0.85.

The optical head device 10 according to the first embodiment satisfies a condition defined by the following equation (3).

$$|\Delta fb\_obj| + |\Delta fb\_opt\text{-}obj\text{-}ca| = |\Delta fb\_ca| \qquad (3)$$

In the above equation (3), Δfb_obj denotes a longitudinal chromatic aberration [μm/nm] occurring in the objective lens 6, Δfb_opt-obj-ca a longitudinal chromatic aberration [μm/nm] occurring in the optical system excluding the objective lens 6 and the aberration correcting element 20, and Δfb_ca a longitudinal chromatic aberration [μm/nm] occurring in the aberration correcting element 20.

Here, if the wavelength of the semiconductor laser 1 changes by 1 nm from 408 nm to 409 nm at the time of recording information on the information recording surface 33, the longitudinal chromatic aberration Δfb_obj occurring in the objective lens 6 is +0.240 [μm/nm] and the longitudinal chromatic aberration Δfb_opt-obj-ca occurring in the optical system excluding the objective lens 6 and the aberration correcting element 20 is +0.020 [μm/nm].

By substituting the longitudinal chromatic aberrations Δfb_obj=+0.240 and Δfb_opt-obj-ca=+0.020 into the above equation (3), the longitudinal chromatic aberration Δfb_ca occurring in the aberration correcting element 20 is 0.26 [μm/nm]. In this way, the longitudinal chromatic aberration Δfb_ca is so determined as to be equal to the sum of the longitudinal chromatic aberration Δfb_obj and the longitudinal chromatic aberration Δfb_opt-obj-ca when the semiconductor laser 1 emits a beam having a wavelength different by a specified wavelength difference. Accordingly, the longitudinal chromatic aberration occurring in the entire optical system from the semiconductor laser 1 to the objective lens 6 can be suppressed.

Next, a modification of the first embodiment is described. The construction of an optical head device 10 according to the modification of the first embodiment is not described since being similar to the one shown in FIG. 1. In the first embodiment, the optical head device 10 satisfies the condition defined by the above equation (3). However, the optical head device 10 according to the modification of the first embodiment satisfies a condition defined by the following equation (4).

$$(|\Delta fb\_obj| + |\Delta fb\_opt\text{-}obj\text{-}ca|) - |0.16|/(LD\_p \times \Delta\lambda/\Delta LD\_p) \leq |\Delta fb\_ca| \qquad (4)$$

In the above equation (4), Δfb_obj denotes a longitudinal chromatic aberration [μm/nm] occurring in the objective lens 6, Δfb_opt-obj-ca a longitudinal chromatic aberration [μm/nm] occurring in an optical system excluding the objective lens 6 and an aberration correcting element 20, Δfb_ca a longitudinal chromatic aberration [μm/nm] occurring in the aberration correcting element 20, LD_p an average power [mW] of the semiconductor laser 1 at the time of recording, and Δλ/ΔLD_p a wavelength variation [nm/mW] caused by the power variation of the semiconductor laser 1.

Here, if the above equation (4) is transformed, the following equation (5) can be obtained.

$$(|\Delta fb\_obj| + |\Delta fb\_opt\text{-}obj\text{-}ca| - |\Delta fb\_ca|) \times LD\_p \times \Delta\lambda/\Delta LD\_p \leq |0.16| \qquad (5)$$

Figure 3:
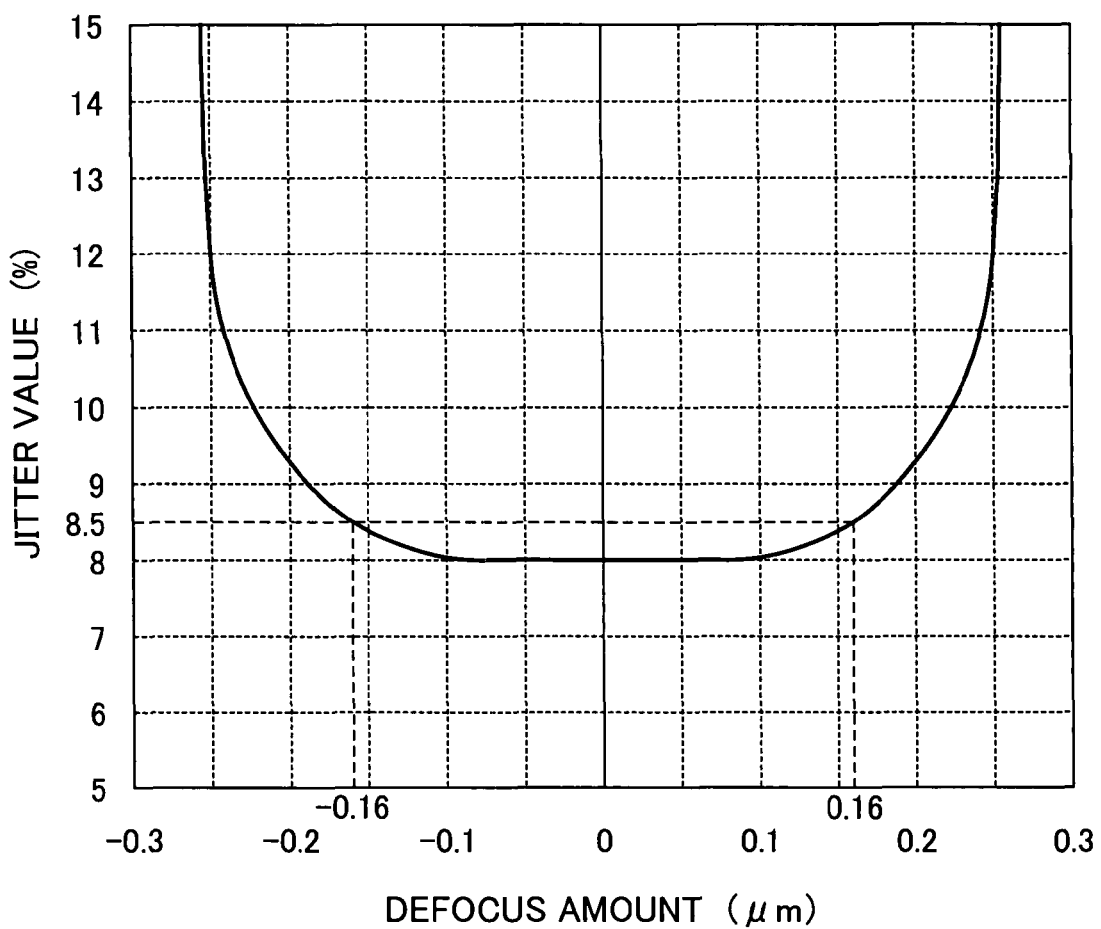
FIG. 3 is a graph showing a relationship between a defocus amount and a jitter value when a mark defocused during at the time of recording is reproduced.

The reason for setting a defocus amount caused by the longitudinal chromatic aberration occurring in the entire optical system to ±0.16 μm or smaller as defined by the above equation (5) is described below. FIG. 3 is a graph showing a relationship between a defocus amount and a jitter value when a mark defocused at the time of recording is reproduced. In FIG. 3, a horizontal axis represents the defocus amount at the time of recording and a vertical axis represents the jitter value.

As shown in FIG. 3, the deterioration of the jitter value starts when the defocus amount exceeds ±0.1 μm. An amount of deterioration of the jitter value caused by the defocusing is preferably 0.5% or less in view of margin allocation. Specifically, in an example of FIG. 3, a bottom value of the jitter value is 8.0%. Thus, if the amount of deterioration is 0.5%, the amount of deterioration of the jitter value by the defocusing is preferably set to 8.5% or less. Accordingly, a permissible range of the defocus amount where the amount of deterioration of the jitter value is 8.5% or less is a range between ±0.16 μm.

Here, the modification of the first embodiment is described, using a specific numerical example. Similar to the first embodiment, the wavelength λ of the light beam emitted from the semiconductor laser 1 is 408 nm. The thicknesses d1, d2, d3 and d4 of the light transmission layers from the incident surface of the light beam to the respective information recording surfaces 31, 32, 33 and 34 are 60 μm, 70 μm, 87.5 μm and 100 μm. The refractive index n of the light transmission layers of the information recording medium is 1.6. VC 79 produced by Sumita Optical Glass, Inc. and having an Abbe number d of 57.9 is used as the material of the objective lens 6. Further, the objective lens 6 is a single lens having a NA (numerical aperture) of 0.85.

At this time, if the wavelength of the semiconductor laser 1 changes by 1 nm from 408 nm to 409 nm at the time of recording information on the information recording surface 33, the longitudinal chromatic aberration Δfb_obj occurring in the objective lens 6 is +0.240 [μm/nm] and the longitudinal chromatic aberration Δfb_opt-obj-ca occurring in the optical system excluding the objective lens 6 and the aberration correcting element 20 is +0.020 [μm/nm].

Further, if the average power LD_p of the semiconductor laser 1 at the time of recording is 100 [mW] and the wavelength variation Δλ/ΔLD_p caused by the power variation of the semiconductor laser 1 is +0.020 [nm/mW], the central wavelength of the light beam changes by 2 nm upon the switch from the reproduction to the recording. At this time, a range where the defocus amount caused by the longitudinal chromatic aberration occurring in the entire optical system does not affect a focus control can be expressed by the above equation (4).

By the above equation (4), the longitudinal chromatic aberration Δfb_ca occurring in the aberration correcting element 20 is −0.200 [μm/nm] and the defocus amount caused by the longitudinal chromatic aberration occurring in the entire optical system is 0.120 [μm]. The defocus amount is 0.16 [μm] or smaller. Accordingly, the defocus amount caused by the longitudinal chromatic aberration occurring in the entire optical system can be suppressed to such level practically presenting no problem.

In this way, a value obtained by multiplying the longitudinal chromatic aberration, which is obtained by subtracting the longitudinal chromatic aberration Δfb_ca from the sum of the longitudinal chromatic aberration Δfb_obj and the longitudinal chromatic aberration Δfb_opt-obj-ca, by the average power LD_p at the time of recording and the wavelength variation Δλ/ΔLD_p lies within the defocus amount permissible range, i.e. the range between ±0.16 μm when the semiconductor laser 1 emits a beam having a wavelength different by a specified wavelength difference. Therefore, the longitudinal chromatic aberration occurring in the entire optical system from the semiconductor laser 1 to the objective lens 6 can be suppressed.

Figure 4:
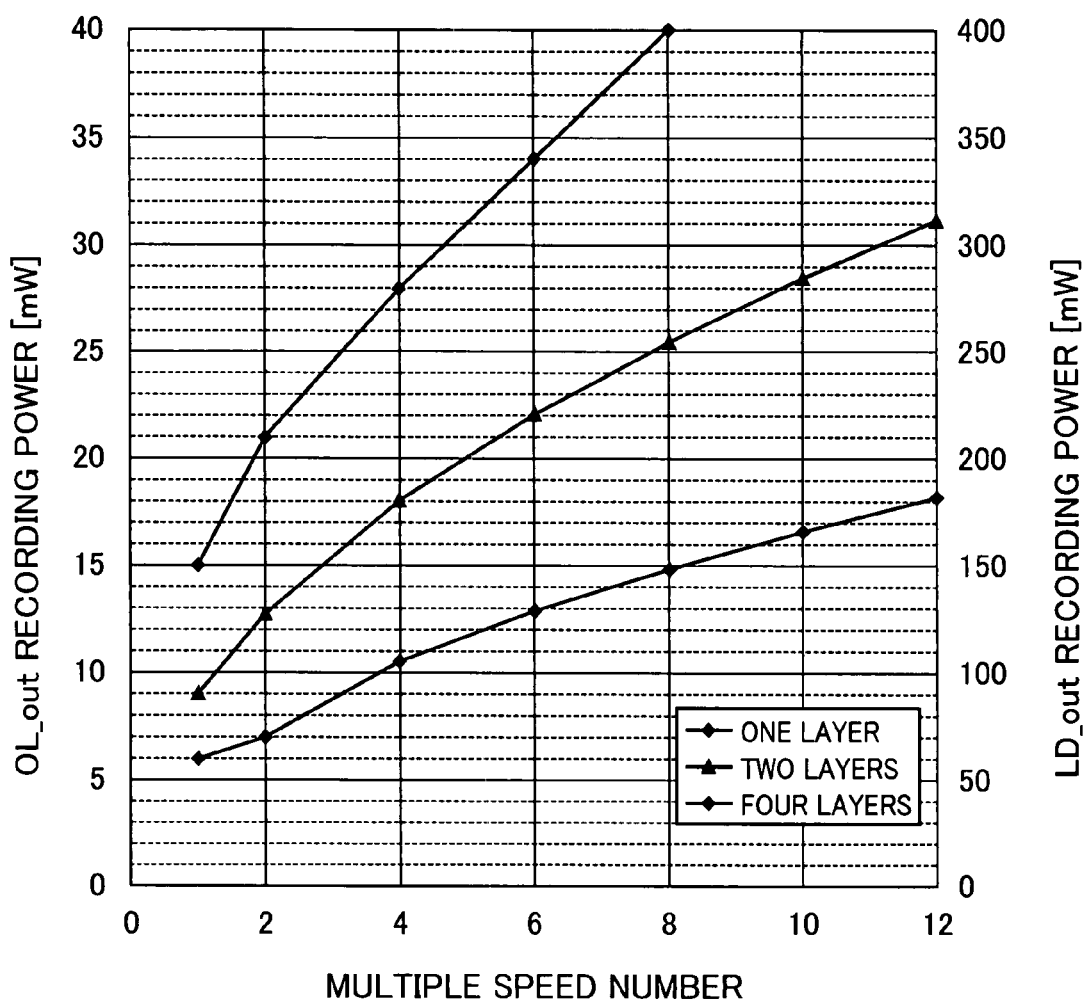
FIG. 4 is a graph showing a relationship between a multiple speed number and a predicted value of a recording power in optical discs having one, two and four layers.

As described above, optical discs have tended to have higher speeds and more layers in recent years. FIG. 4 is a graph showing a relationship between a multiple speed number and a predicted value of a recording power in optical discs having one, two and four layers. In FIG. 4, a horizontal axis represents the multiple speed number of the optical disc, a left vertical axis represents the recording power (OL_out recording power) of the light beam emerging from the objective lens and a right vertical axis represents the recording power (LD_out recording power) of the laser beam emitted from the light source when the light utilization efficiency of the optical head device is 10%.

By the speeding up and higher stratification of optical discs, if the OL_out recording power exceeds 20 mW and the LD_out recording power exceeds 200 mW, the average power of the laser beam emitted from the semiconductor laser 1 at the time of recording is 100 mW or above. If the average power of the semiconductor laser 1 at the time of recording an information signal on the information recording surface of the optical disc 30 is 100 mW or above, the wavelength of the semiconductor laser 1 varies by 2 nm or longer, wherefore an amount of the longitudinal chromatic aberration occurring in the light guiding portion 11 excluding the objective lens 6 and the aberration correcting element 20 cannot be ignored.

However, since the longitudinal chromatic aberration occurring in the entire optical system from the semiconductor laser 1 to the objective lens 6 is corrected based on the longitudinal chromatic aberration occurring in the objective lens 6, the longitudinal chromatic aberration occurring in the light guiding portion 11 excluding the objective lens 6 and the aberration correcting element 20 and the longitudinal chromatic aberration occurring in the aberration correcting element 20, it can be suppressed even if the average power of the semiconductor laser 1 at the time of recording an information signal on the information recording surface of the optical disc 30 is 100 nW or higher.

Further, in the case of correcting a chromatic aberration by the aberration correcting element 20 used in the optical head device 10, the longitudinal chromatic aberration Δfb_obj occurring in the objective lens 6, the longitudinal chromatic aberration Δfb_opt-obj-ca occurring in the optical system excluding the objective lens 6 and the aberration correcting element 20, the average power LD_p of the semiconductor laser 1 at the time of recording and the power wavelength variation Δλ/ΔLD_p caused by the power variation of the semiconductor laser 1 are determined when the semiconductor laser 1 emits a beam having a wavelength different by the specified wavelength difference, and the longitudinal chromatic aberration Δfb_ca occurring in the aberration correcting element 20 is so determined as to satisfy the condition defined by the above equation (4).

As described above, the longitudinal chromatic aberration Δfb_ca occurring in the aberration correcting element 20 is determined to be equal to or larger than a value obtained by subtracting a quotient of |0.16| by a product of the average power LD_p at the time of recording and the wavelength variation Δλ/ΔLD_p from the sum of the longitudinal chromatic aberration Δfb_obj and the longitudinal chromatic aberration Δfb_opt-obj-ca. Accordingly, the longitudinal chromatic aberration occurring in the entire optical system from the semiconductor laser 1 to the objective lens 6 can be suppressed.

Further, the influence of the optical axis deviation caused by the tracking drive can be suppressed substantially to a negligible level by integrally holding the objective lens 6 and the aberration correcting element 20 by the biaxial actuator 9, but variations occur upon mounting the objective lens 6 and the aberration correcting element 20 on the biaxial actuator 9. This is due to the outer diameter tolerance of the objective lens 6, the outer diameter tolerance of the aberration correcting element 20 and the tolerance of the lens holding portion of the biaxial actuator 9. In view of assemblability, mass productivity and cost, variations of about 70 μm are thought to occur, but preferably these variations are suppressed to 40 μm.

Since an angular variation of the aberration correcting element 20 in relation to a wavelength change is 0.200 [min/nm], a spot moving amount caused by the magnification chromatic aberration is 25 nm, wherefore the magnification chromatic aberration occurring due to a mounting error can be suppressed to such a level practically presenting no problem. Since a corrected amount of the longitudinal chromatic aberration and that of the magnification chromatic aberration are in a contradictory relationship, they need to be suitably allocated to ensure stable performances in the focusing drive and the tracking drive.

Figure 5:
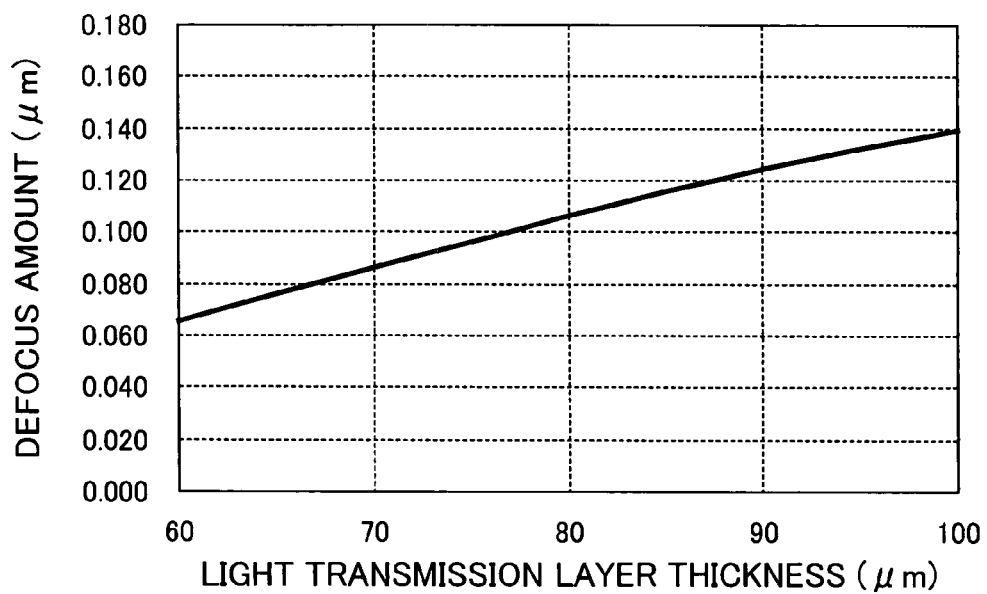
FIG. 5 is a graph showing a defocus amount caused by a longitudinal chromatic aberration in relation to a light transmission layer thickness in the optical head device according to the first embodiment of the invention.
Figure 6:
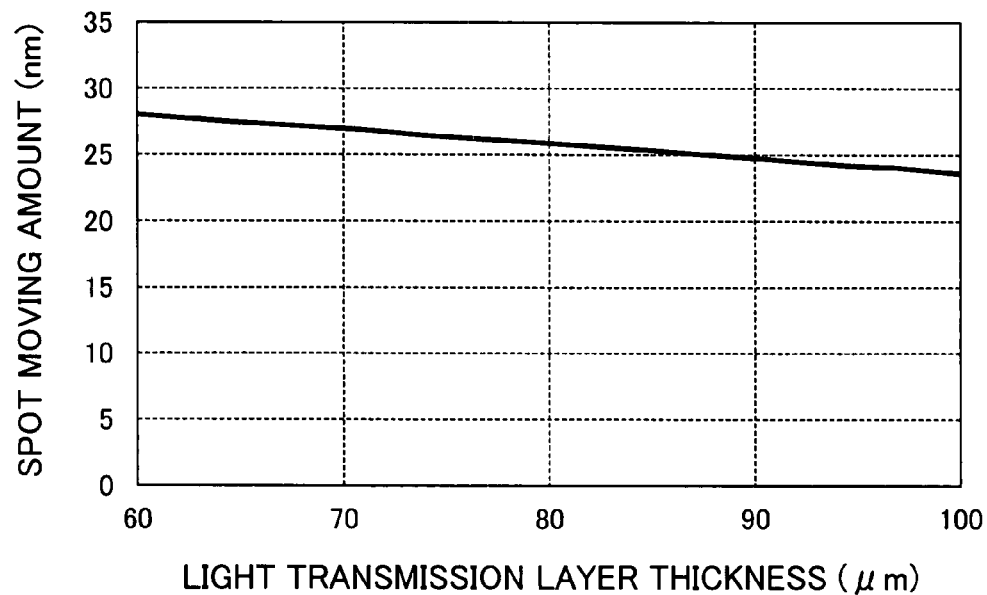
FIG. 6 is a graph showing a spot moving amount caused by a magnification chromatic aberration in relation to the light transmission layer thickness in the optical head device according to the first embodiment of the invention.

Further, since a divergent/convergent beam is incident on the objective lens 6 at the time of recording or reproduction on or from each information recording surface, both the longitudinal chromatic aberration and the magnification chromatic aberration are influenced by the light transmission layer thickness at the time of recording or reproduction. FIG. 5 is a graph showing the defocus amount caused by the longitudinal chromatic aberration in relation to the light transmission layer thickness and FIG. 6 is a graph showing the spot moving amount caused by the magnification chromatic aberration in relation to the light transmission layer thickness. In FIG. 5, a vertical axis represents the defocus amount and a horizontal axis represents the light transmission layer thickness. In FIG. 6, a vertical axis represents the spot moving amount and a horizontal axis represents the light transmission layer thickness.

As shown in FIG. 5, the defocus amount tends to increase as the light transmission layer thickness increases, but the defocus amount caused by the longitudinal chromatic aberration can be suppressed to about 0.140 nm even if a laser beam is focused on the information recording layer having the largest light transmission layer thickness of 100 μm. Further, as shown in FIG. 6, the spot moving amount tends to decrease as the light transmission layer thickness increases, but the spot moving amount caused by the magnification chromatic aberration can be suppressed to about from 28 nm to 24 nm even if the light transmission layer thickness changes from 60 μm to 100 μm.

Thus, the defocus amount caused by the longitudinal chromatic aberration and the spot moving amount caused by the magnification chromatic aberration are both at levels presenting substantially no problem, wherefore stable focusing drive and tracking drive can be performed.

Figure 7:
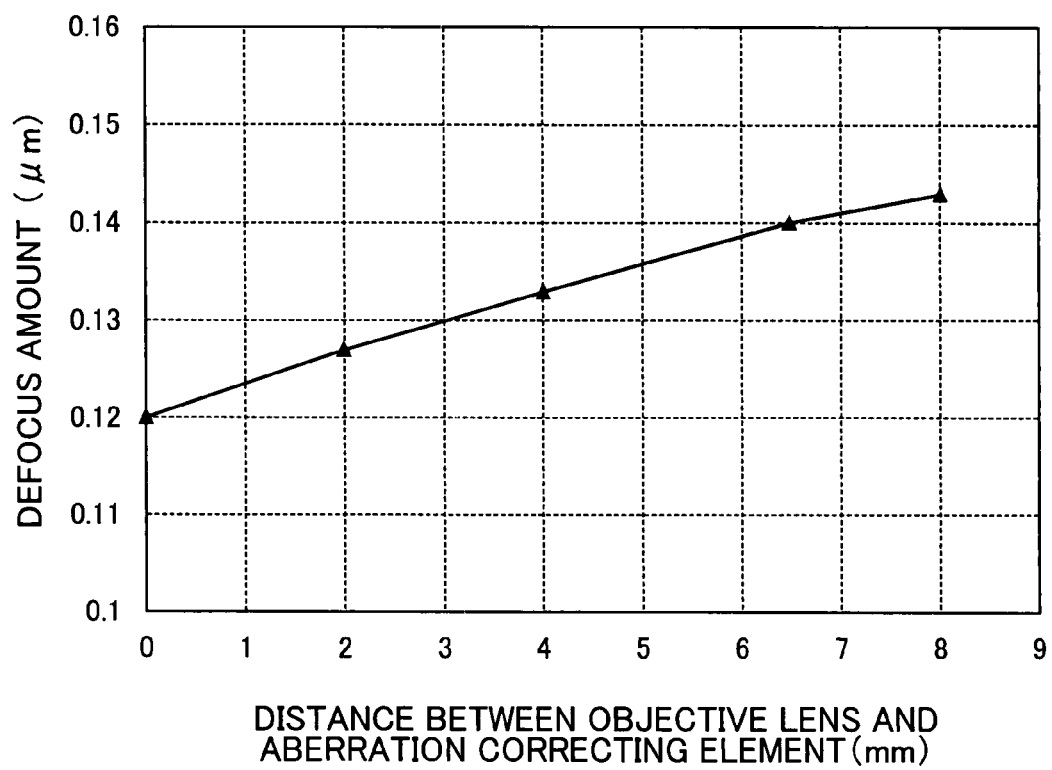
FIG. 7 is a graph showing a defocus amount in relation to a distance between an objective lens and an aberration correcting element when the light transmission layer thickness is 100 µm.

The cause of the variations of the defocus amount and the spot moving amount according to the thickness of the light transmission layer lies in a distance between the objective lens 6 and the aberration correcting element 20. FIG. 7 is a graph showing the defocus amount in relation to the distance between the objective lens and the aberration correcting element when the light transmission layer thickness is 100 µm.

An aperture (not shown) for determining a beam to be incident on the objective lens 6 is provided very close to the objective lens 6. Thus, if a divergent beam is incident on the objective lens 6, a beam smaller than the incident beam on the objective lens 6 is incident on the aberration correcting element 20 at a specified distance from the objective lens 6. Therefore, the corrected amount of the longitudinal chromatic aberration is smaller as compared to the case of a parallel beam.

On the contrary, if a convergent beam is incident on the objective lens 6, a beam larger than the incident beam on the objective lens 6 is incident on the aberration correcting element 20. Thus, in this case, the corrected amount of the longitudinal chromatic aberration increases as compared to the case of a parallel beam. Of course, this corrected amount is substantially equal to the defocus amount in the case of a parallel beam if the distance between the objective lens 6 and the aberration correcting element 20 is 0. Further, since the spot moving amount caused by the magnification chromatic aberration increases as the corrected amount by the aberration correcting element increases, the spot moves to a larger extent if a convergent beam is incident on the objective lens 6.

The distance between the objective lens 6 and the aberration correcting element 20 is mainly determined for the following two reasons. Firstly, the aberration correcting element 20 is arranged at such a position as not to be affected by the heat generation from a coil of the biaxial actuator 9 since the aberration correcting element 20 is made of resin. Secondly, the aberration correcting element 20 and the objective lens 6 are arranged in view of balance therebetween. As a result, in this embodiment, the distance between the objective lens 6 and the aberration correcting element 20 is determined to be 6.5 mm and the defocus amount is 0.14 µm if the light transmission layer thickness is 100 µm.

There is practically no problem if the relationship of the above equation (3) or (4) can be satisfied even if the average power of the semiconductor laser 1 at the time of recording is 100 mW or below. There is practically no problem, either, if the relationship of the above equation (3) or (4) can be satisfied even if the average power of the semiconductor laser 1 at the time of recording is 100 mW or above.

There is practically no problem in using a material other than the above VC79 as the material of the objective lens 6 if the relationship of the above equation (3) or (4) can be satisfied. Further, the use of a plastic lens as the objective lens 6 is preferable because it is advantageous in terms of lightweight and low cost.

Although the optical information recording medium has four information recording surfaces in this embodiment, similar effects can be obtained even if the optical information recording medium has two, three, five or more information recording surfaces.

Figure 8:
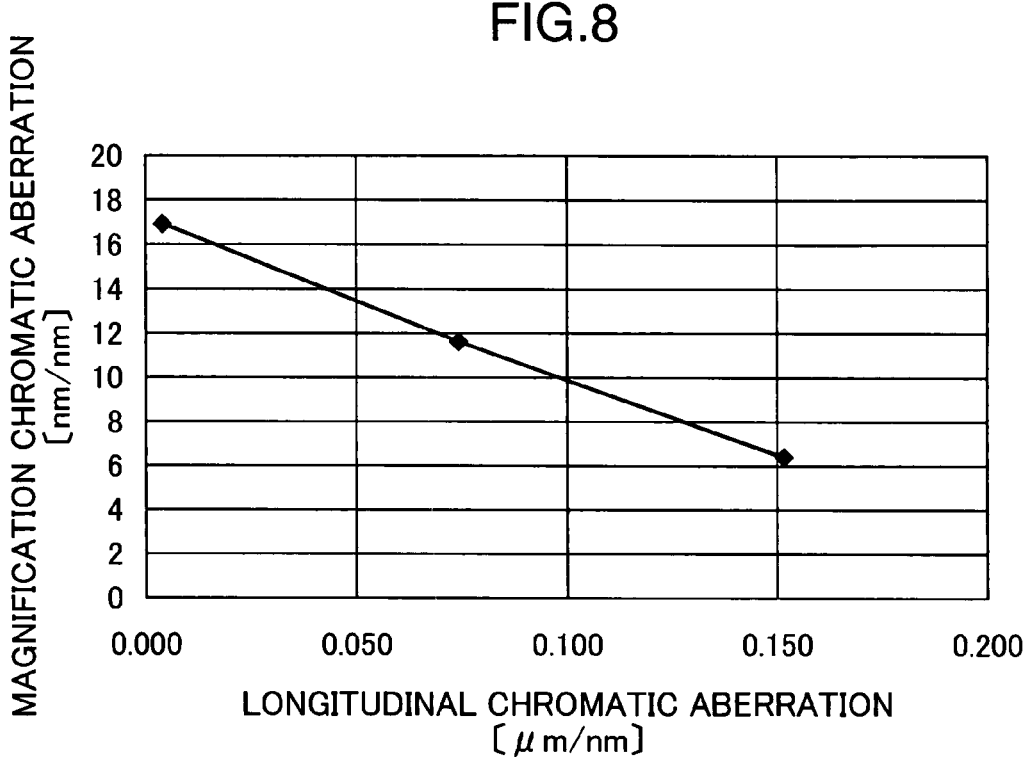
FIG. 8 is a graph showing a relationship between a longitudinal chromatic aberration and a magnification chromatic aberration in an entire optical system in a modification of the first embodiment of the invention.

FIG. 8 is a graph showing a relationship between a longitudinal chromatic aberration and a magnification chromatic aberration in an entire optical system in a modification of the first embodiment of the invention. For calculation conditions in FIG. 8, the optical axis deviation amount between the objective lens 6 and the aberration correcting element 20 is 70 µm if a parallel beam is incident on the objective lens 6. A horizontal axis represents a longitudinal chromatic aberration of the entire optical system and a vertical axis represents a magnification chromatic aberration of the entire optical system.

As the corrected amount of the longitudinal chromatic aberration is increased by the aberration correcting element 20 in order to suppress the longitudinal chromatic aberration in the entire optical system, the magnification chromatic aberration increases due to the optical axis deviation between the objective lens 6 and the aberration correcting element 20. In other words, it will be seen that the longitudinal chromatic aberration and the magnification chromatic aberration are in an opposite relationship.

Figure 9:
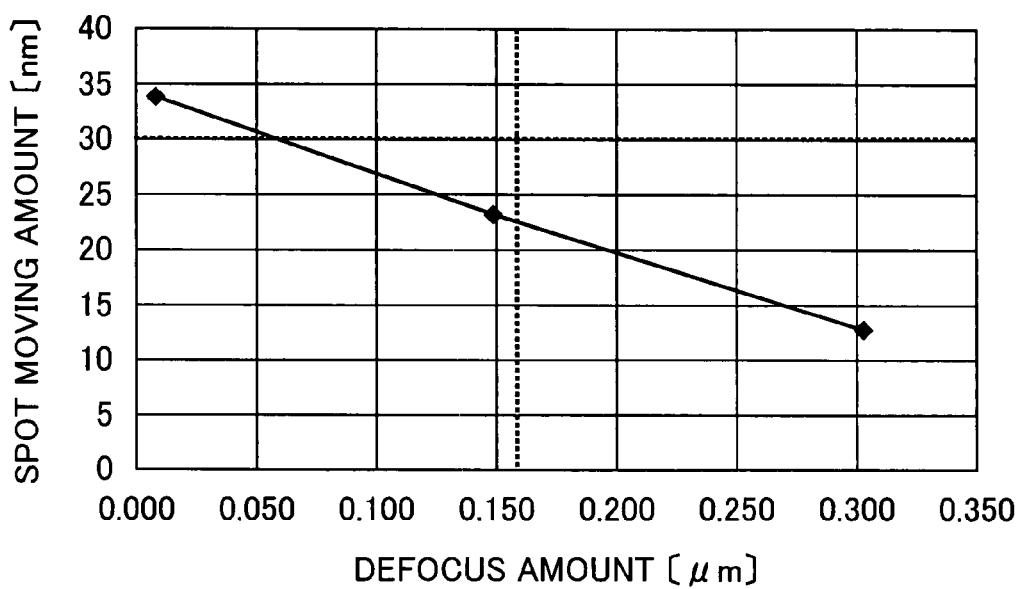
FIG. 9 is a graph showing a relationship between a defocus amount caused by a longitudinal chromatic aberration and a spot moving amount caused by a magnification chromatic aberration in the modification of the first embodiment of the invention.

FIG. 9 shows a relationship between a defocus amount caused by a longitudinal chromatic aberration and a spot moving amount caused by a magnification chromatic aberration in the case where an average power of a semiconductor laser at the time of recording is 100 mW and a wavelength variation caused by a power variation of the semiconductor laser is 0.020 nm/mW in the optical system having this relationship. In FIG. 9, the defocus amount is preferably 0.16 µm as described above. Also, the spot moving causes a deviation of a tracking error signal. The tracking control cannot be stable performed if a deviation of a tracking error signal is 50% or more. For this reason, a deviation of a tracking error signal is preferably 50% or less. Accordingly, a spot moving amount is preferably 30 nm or less.

In a case where an average power of a semiconductor laser at the time of recording is 100 mW, accordingly, the defocus amount of the entire optical system is required to be in a range between 0.06 µm and 0.16 µm to keep the spot moving amount 30 nm or less. It will be seen from FIG. 8 that the correcting amount of the aberration correcting element 20 must be determined so that the remaining longitudinal chromatic aberration is in a range between 0.03 µm/nm and 0.08 µm/nm. In the modification of the first embodiment, a remaining longitudinal chromatic aberration of the entire optical system is 0.06 µm/nm, which is in the above-mentioned range.

Second Embodiment

Figure 10:
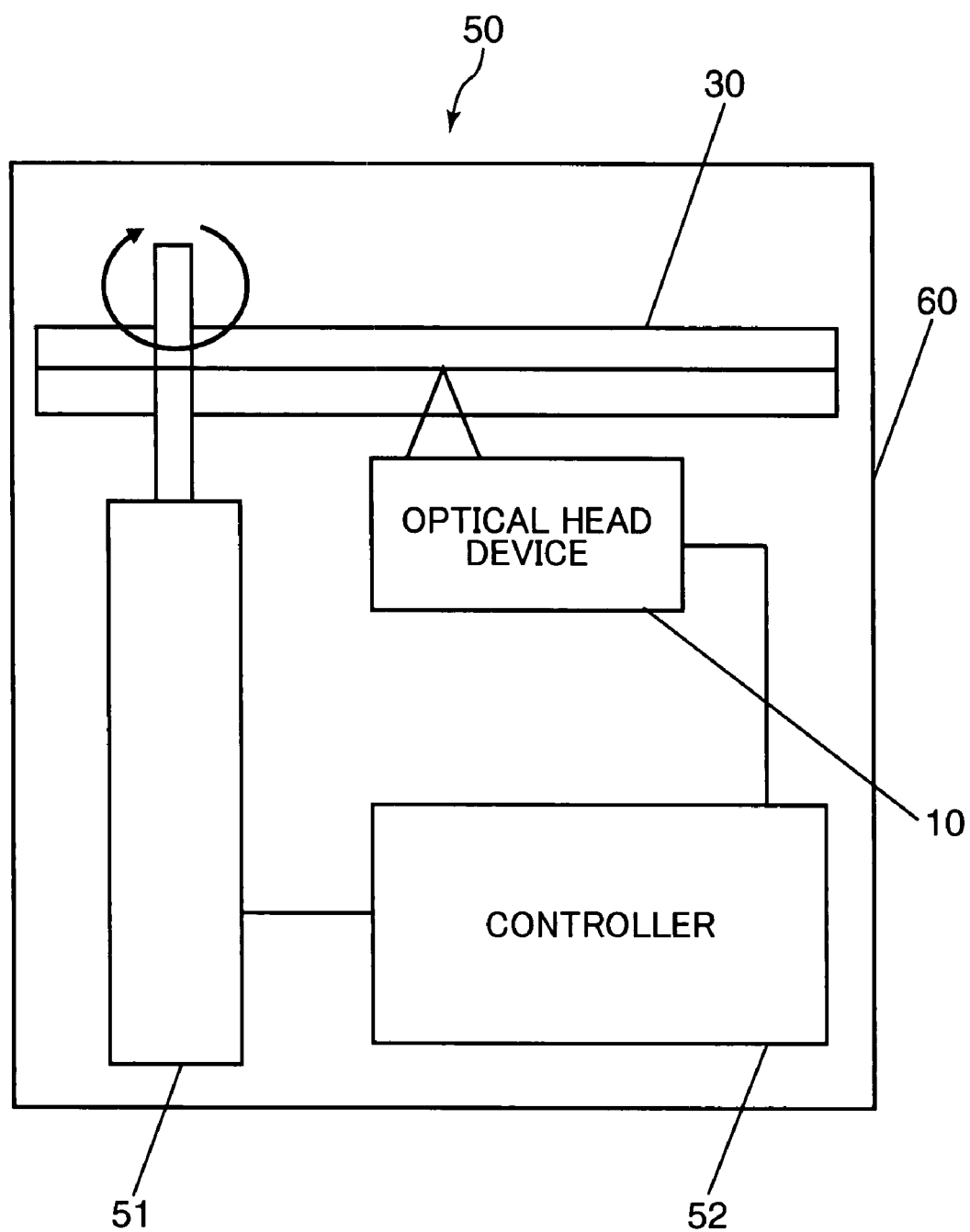
FIG. 10 is a schematic construction diagram of an optical information processing apparatus according to a second embodiment of the invention.

FIG. 10 is a diagram showing the schematic construction of an optical disc device according to a second embodiment of the present invention.

In FIG. 10, an optical disc apparatus (optical information processing apparatus) 50 is provided with an optical disc driving device (rotating device) 51, a controller 52 and an optical head device 10. The optical disc driving device 51 drivingly rotates an optical disc 30.

The optical head device 10 is the optical head device described in the first embodiment, and includes a light receiving element 8 for converting a received beam, which was reflected by the optical disc 30 and passed through an objective lens 6, into an electrical signal corresponding to an amount of the received light, and a biaxial actuator 9 for driving the objective lens 6 at least in a radial direction relative to an information track of the optical disc 30.

The controller 52 has a function of controllably driving the optical disc driving device 51 and the optical head device 10, a function of processing control signals and information signals received by the optical head device 10, and a function of interfacing information signals between the outside and inside of a casing 60. The controller 52 controls the driving of the optical disc driving device 51 and controls the driving of the biaxial actuator 9 of the optical head device 10 in accordance with an electrical signal received from the light receiving element 8 of the optical head device 10 to perform a focusing control and a tracking control for the optical disc 30.

Since the optical head device of the first embodiment is installed as the optical head device 10, the optical head device of this embodiment can suppress a defocus amount caused by a longitudinal chromatic aberration and a spot moving amount caused by a magnification chromatic aberration, both aberrations occurring upon the switch from the reproduction to the recording, wherefore recording and reproduction characteristics of the optical disc 30 can be improved.

The specific embodiments described above mainly embrace inventions having the following constructions.

An optical head device according to one aspect of the present invention comprises a light source; an aberration correcting element for transmitting a beam from the light source; a light guiding portion for introducing the beam from the light source to the aberration correcting element; and an objective lens for focusing the beam having passed through the aberration correcting element on an optical information recording medium, wherein the aberration correcting element corrects a longitudinal chromatic aberration occurring in the objective lens and a longitudinal chromatic aberration occurring in the light guiding portion excluding the objective lens and the aberration correcting element based on a longitudinal chromatic aberration occurring in the aberration correcting element when the light source emits a beam having a wavelength different by a specified wavelength difference.

According to this construction, the beam is emitted from the light source and the aberration correcting element transmits the beam from the light source. The beam from the light source is introduced to the aberration correcting element by the light guiding portion, and the beam having passed through the aberration correcting element is focused on the optical information recording medium by the objective lens. When the light source emits a beam having a wavelength different by the specified wavelength difference, the longitudinal chromatic aberration occurring in the objective lens and the longitudinal chromatic aberration occurring in the light guiding portion excluding the objective lens and the aberration correcting element are corrected based on the longitudinal chromatic aberration occurring in the aberration correcting element.

Accordingly, not only the longitudinal chromatic aberration occurring in the objective lens, but also the longitudinal chromatic aberration occurring in the entire optical system from the light source to the objective lens can be suppressed, thereby being able to realize stable focusing drive and tracking drive.

In the above optical head device, the longitudinal chromatic aberration $\Delta fb\_obj$ occurring in the objective lens, the longitudinal chromatic aberration $\Delta fb\_opt\text{-}obj\text{-}ca$ occurring in the light guiding portion excluding the objective lens and the aberration correcting element and the longitudinal chromatic aberration $\Delta fb\_ca$ occurring in the aberration correcting element preferably satisfy a condition defined by equation (6) when the light source emits the beam having the wavelength different by the specified wavelength:

$$|\Delta fb\_obj| + |\Delta fb\_opt\text{-}obj\text{-}ca| = |\Delta fb\_ca| \quad (6).$$

According to this construction, the sum of the longitudinal chromatic aberration $\Delta fb\_obj$ and the longitudinal chromatic aberration $\Delta fb\_opt\text{-}obj\text{-}ca$ is equal to the longitudinal chromatic aberration $\Delta fb\_ca$ when the light source emits the beam having the wavelength different by the specified wavelength. Therefore, the longitudinal chromatic aberration occurring in the entire optical system from the objective lens to the objective lens can be suppressed.

In the above optical head device, the longitudinal chromatic aberration $\Delta fb\_obj$ occurring in the objective lens, the longitudinal chromatic aberration $\Delta fb\_opt\text{-}obj\text{-}ca$ occurring in the light guiding portion excluding the objective lens and the aberration correcting element, the longitudinal chromatic aberration $\Delta fb\_ca$ occurring in the aberration correcting element, an average power $LD\_p$ of the light source at the time of recording and a wavelength variation $\Delta\lambda/\Delta LD\_p$ caused by a power variation of the light source preferably satisfy a condition defined by equation (7) when the light source emits the beam having the wavelength different by the specified wavelength:

$$(|\Delta fb\_obj| + |\Delta fb\_opt\text{-}obj\text{-}ca|) - |0.16|/(LD\_p \times \Delta\lambda/\Delta LD\_p) \leq |\Delta fb\_ca| \quad (7).$$

According to this construction, the longitudinal chromatic aberration $\Delta fb\_ca$ is set to be equal to or larger than a value obtained by subtracting a quotient of $|0.16|$ by a product of the average power $LD\_p$ at the time of recording and the wavelength variation $\Delta\lambda/\Delta LD\_p$ from the sum of the longitudinal chromatic aberration $\Delta fb\_obj$ and the longitudinal chromatic aberration $\Delta fb\_opt\text{-}obj\text{-}ca$ when the light source emits a beam having a wavelength different by the specified wavelength difference. Therefore, the longitudinal chromatic aberration occurring in the entire optical system from the light source to the objective lens can be suppressed.

In the above optical head device, the light guiding portion preferably includes a first optical element for reflecting or transmitting the beam from the light source, a second optical element for changing a polarization direction of the beam reflected by or having passed through the first optical element and a collimator lens for converting the beam having the polarization direction thereof changed by the second optical element into a parallel beam.

According to this construction, the beam from the light source is reflected by or passes through the first optical element, and the beam reflected by or having passed through the first optical element has the polarization direction thereof changed by the second optical element, and the beam having the polarization direction thereof changed by the second optical element is converted into the parallel beam. Therefore, longitudinal chromatic aberrations caused by the first and second optical elements and the collimator lens can be suppressed.

In the above optical head device, an average power of the light source at the time of recording an information signal on an information recording surface of the optical information recording medium is preferably 100 mW or above.

If the average power of the light source at the time of recording an information signal on the information recording surface of the optical information recording medium is 100 mW or above, the wavelength of the light source varies by 2 nm or longer, wherefore an amount of the longitudinal chromatic aberration occurring in the light guiding portion excluding the objective lens and the aberration correcting element cannot be ignored any longer. However, since the longitudinal chromatic aberration occurring in the entire optical system from the light source to the objective lens is corrected based on the longitudinal chromatic aberration occurring in the objective lens, the longitudinal chromatic aberration occurring in the light guiding portion excluding the objective lens and the aberration correcting element and the longitudinal chromatic aberration occurring in the aberration correcting element, the longitudinal chromatic aberration occurring in the entire optical system from the light source can the objective lens can be suppressed even if the average power of the light source at the time of recording an information signal on the information recording surface of the optical information recording medium is 100 mW or above.

An aberration correction method of an aberration correcting element according to another aspect of the present invention is for an aberration correcting element used in the above optical head device and characterized in that a longitudinal chromatic aberration Δfb_obj occurring in an objective lens and a longitudinal chromatic aberration Δfb_opt-obj-ca occurring in a light guiding portion excluding the objective lens and the aberration correcting element when a light source emits a beam having a wavelength different by a specified wavelength difference are determined, and a longitudinal chromatic aberration Δfb_ca occurring in the aberration correcting element is so determined as to satisfy a condition defined by equation (8):

$$(|\Delta fb\_obj|+|\Delta fb\_opt\text{-}obj\text{-}ca|)=|\Delta fb\_ca| \quad (8).$$

According to this construction, the longitudinal chromatic aberration Δfb_obj occurring in the objective lens and the longitudinal chromatic aberration Δfb_opt-obj-ca occurring in the light guiding portion excluding the objective lens and the aberration correcting element when the light source emits a beam having a wavelength different by a specified wavelength difference are determined. Then, the longitudinal chromatic aberration Δfb_ca occurring in the aberration correcting element is so determined as to be equal to the sum of the longitudinal chromatic aberration Δfb_obj and the longitudinal chromatic aberration Δfb_opt-obj-ca. Accordingly, the longitudinal chromatic aberration occurring in the entire optical system from the light source to the objective lens can be suppressed.

An aberration correction method of an aberration correcting element according to still another aspect of the present invention is for an aberration correcting element used in the above optical head device and characterized in that a longitudinal chromatic aberration Δfb_obj occurring in an objective lens, a longitudinal chromatic aberration Δfb_opt-obj-ca occurring in a light guiding portion excluding the objective lens and the aberration correcting element, an average power LD_p of a light source at the time of recording and a wavelength variation Δλ/ΔLD_p caused by a power variation of the light source when the light source emits a beam having a wavelength different by a specified wavelength difference are determined, and a longitudinal chromatic aberration Δfb_ca occurring in the aberration correcting element is so determined as to satisfy a condition defined by equation (9):

$$(|\Delta fb\_obj|+|\Delta fb\_opt\text{-}obj\text{-}ca|)-|0.16|/(LD\_p \times \Delta\lambda/\Delta LD\_p) \leq |\Delta fb\_ca| \quad (9)$$

According to this construction, the longitudinal chromatic aberration Δfb_obj occurring in the objective lens, the longitudinal chromatic aberration Δfb_opt-obj-ca occurring in the light guiding portion excluding the objective lens and the aberration correcting element, the average power LD_p of the light source at the time of recording and the wavelength variation Δλ/ΔLD_p caused by a power variation of the light source when the light source emits a beam having a wavelength different by a specified wavelength difference are determined. The longitudinal chromatic aberration Δfb_ca occurring in the aberration correcting element is so determined as to be equal to or larger than a value obtained by subtracting a quotient of |0.16| by a product of the average power LD_p at the time of recording and the wavelength variation Δλ/ΔLD_p from the sum of the longitudinal chromatic aberration Δfb_obj and the longitudinal chromatic aberration Δfb_opt-obj-ca. Therefore, the longitudinal chromatic aberration occurring in the entire optical system from the light source to the objective lens can be suppressed.

An optical information processing apparatus according to further another aspect of the present invention is for recording and/or reproducing an information signal on and/or from an optical information recording medium and comprises a rotating device for rotating the optical information recording medium; an optical head device, which is the above optical head device and further includes a light receiving element for receiving a beam, which was reflected by the optical information recording medium and passed through the objective lens, and converting the received beam into an electrical signal corresponding to an amount of the beam and an actuator for driving the objective lens at least in a radial direction relative to an information track of the optical information recording medium; and a controller for controllably driving the rotating device and controllably driving the actuator of the optical head device in accordance with the electrical signal received from the light receiving element of the optical head device to perform a focusing control and a tracking control for the optical information recording medium.

According to this construction, the longitudinal chromatic aberration occurring in the entire optical system from the light source to the objective lens can be suppressed by using the above optical head device. Therefore, an optical information processing apparatus can be provided which realizes highly accurate focusing drive and tracking drive.

According to the present invention, not only the longitudinal chromatic aberration occurring in the objective lens, but also the longitudinal chromatic aberration occurring in the entire optical system from the light source to the objective lens can be suppressed, thereby being able to realize stable focusing drive and tracking drive.

The optical head device, an aberration correction method and optical information processing apparatus according to the present invention can suppress not only the longitudinal chromatic aberration occurring in the objective lens, but also the longitudinal chromatic aberration occurring in the entire optical system from the light source to the objective lens, and are useful as an optical head device for recording and/or reproducing an information signal on or from an optical information recording medium and an optical information processing apparatus provided with such an optical head device.

This application is based on patent application No. 2006-273819 filed in Japan, the contents of which are hereby incorporated by references.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An optical head device comprising:
a light source;

an aberration correcting element for transmitting a beam from the light source;
a light guiding portion for introducing the beam from the light source to the aberration correcting element; and
an objective lens for focusing the beam having passed through the aberration correcting element on an optical information recording medium,
wherein the aberration correcting element corrects a longitudinal chromatic aberration occurring in the objective lens and a longitudinal chromatic aberration occurring in the light guiding portion excluding the objective lens and the aberration correcting element based on a longitudinal chromatic aberration occurring in the aberration correcting element when the light source emits a beam having a wavelength different by a specified wavelength difference, and
wherein the longitudinal chromatic aberration $\Delta fb\_obj$ occurring in the objective lens, the longitudinal chromatic aberration $\Delta fb\_opt\text{-}obj\text{-}ca$ occurring in the light guiding portion excluding the objective lens and the aberration correcting element and the longitudinal chromatic aberration $\Delta fb\_ca$ occurring in the aberration correcting element satisfy a condition defined by the equation:

$$|\Delta fb\_obj| + |\Delta fb\_opt\text{-}obj\text{-}ca| = |\Delta fb\_ca|$$

when the light source emits the beam having the wavelength different by the specified wavelength.

2. An optical head device comprising:
a light source;
an aberration correcting element for transmitting a beam from the light source;
a light guiding portion for introducing the beam from the light source to the aberration correcting element; and
an objective lens for focusing the beam having passed through the aberration correcting element on an optical information recording medium,
wherein the aberration correcting element corrects a longitudinal chromatic aberration occurring in the objective lens and a longitudinal chromatic aberration occurring in the light guiding portion excluding the objective lens and the aberration correcting element based on a longitudinal chromatic aberration occurring in the aberration correcting element when the light source emits a beam having a wavelength different by a specified wavelength difference, and
wherein the longitudinal chromatic aberration $\Delta fb\_obj$ occurring in the objective lens, the longitudinal chromatic aberration $\Delta fb\_opt\text{-}obj\text{-}ca$ occurring in the light guiding portion excluding the objective lens and the aberration correcting element, the longitudinal chromatic aberration $\Delta fb\_ca$ occurring in the aberration correcting element, an average power $LD\_p$ of the light source at the time of recording and a wavelength variation $\Delta\lambda/\Delta LD\_p$ caused by a power variation of the light source satisfy a condition defined by the equation:

$$(|\Delta fb\_obj| + |\Delta fb\_opt\text{-}obj\text{-}ca|) - |0.16|(LD\_p \times \Delta\lambda/\Delta LD\_p) \leq |\Delta fb\_ca|$$

when the light source emits the beam having the wavelength different by the specified wavelength.

3. An optical head device according to claim 1, wherein the light guiding portion includes:
a first optical element for reflecting or transmitting the beam from the light source;
a second optical element for changing a polarization direction of the beam reflected by or having passed through the first optical element; and
a collimator lens for converting the beam having the polarization direction thereof changed by the second optical element into a parallel beam.

4. An optical head device according to claim 1, wherein an average power of the light source at the time of recording an information signal on an information recording surface of the optical information recording medium is 100 mW or above.

5. An aberration correction method of an aberration correcting element used in an optical head device according to claim 1, wherein:
a longitudinal chromatic aberration $\Delta fb\_obj$ occurring in an objective lens and a longitudinal chromatic aberration $\Delta fb\_opt\text{-}obj\text{-}ca$ occurring in a light guiding portion excluding the objective lens and the aberration correcting element when a light source emits a beam having a wavelength different by a specified wavelength difference are determined; and
a longitudinal chromatic aberration $\Delta fb\_ca$ occurring in the aberration correcting element is so determined as to satisfy a condition defined by the equation:

$$(|\Delta fb\_obj| + |\Delta fb\_opt\text{-}obj\text{-}ca|) = |\Delta fb\_ca|.$$

6. An aberration correction method of an aberration correcting element used in an optical head device according to claim 2, wherein:
a longitudinal chromatic aberration $\Delta fb\_obj$ occurring in the objective lens, a longitudinal chromatic aberration $\Delta fb\_opt\text{-}obj\text{-}ca$ occurring in the light guiding portion excluding the objective lens and the aberration correcting element, an average power $LD\_p$ of the light source at the time of recording and a wavelength variation $\Delta\lambda/\Delta LD\_p$ caused by a power variation of the light source when the light source emits a beam having a wavelength different by a specified wavelength difference are determined; and
a longitudinal chromatic aberration $\Delta fb\_ca$ occurring in the aberration correcting element is so determined as to satisfy a condition defined by the equation:

$$(|\Delta fb\_obj| + |\Delta fb\_opt\text{-}obj\text{-}ca|) - |0.16|(LD\_p \times \Delta\lambda/\Delta LD\_p) \leq |fb\_ca|.$$

7. An optical information processing apparatus for recording and/or reproducing an information signal on and/or from an optical information recording medium, comprising:
a rotating device for rotating the optical information recording medium;
an optical head device, which is an optical head device according to claim 1 and further includes a light receiving element for receiving a beam, which was reflected by the optical information recording medium and passed through the objective lens, and converting the received beam into an electrical signal corresponding to an amount of the beam and an actuator for driving the objective lens at least in a radial direction relative to an information track of the optical information recording medium; and
a controller for controllably driving the rotating device and controllably driving the actuator of the optical head device in accordance with the electrical signal received from the light receiving element of the optical head device to perform a focusing control and a tracking control for the optical information recording medium.

8. An optical information processing apparatus for recording and/or reproducing an information signal on and/or from an optical information recording medium, comprising:

a rotating device for rotating the optical information recording medium;

an optical head device, which is an optical head device according to claim 2 and further includes a light receiving element for receiving a beam, which was reflected by the optical information recording medium and passed through the objective lens, and converting the received beam into an electrical signal corresponding to an amount of the beam and an actuator for driving the objective lens at least in a radial direction relative to an information track of the optical information recording medium; and a controller for controllably driving the rotating device and controllably driving the actuator of the optical head device in accordance with the electrical signal received from the light receiving element of the optical head device to perform a focusing control and a tracking control for the optical information recording medium.

* * * * *

UNITED STATES PATENT AND TRADEMARK OFFICE
CERTIFICATE OF CORRECTION

| | | |
|---|---|---|
| PATENT NO. | : 7,848,208 B2 | Page 1 of 1 |
| APPLICATION NO. | : 11/905927 | |
| DATED | : December 7, 2010 | |
| INVENTOR(S) | : Eishin Mori et al. | |

It is certified that error appears in the above-identified patent and that said Letters Patent is hereby corrected as shown below:

Column 18, lines 43 and 44

"$(|\Delta fb\_obj| + |\Delta fb\_opt - obj - ca|) - |0.16|(LD\_p \times \Delta\lambda / \Delta LD\_p) \leq |\Delta fb\_ca|.$" should read
-- $(|\Delta fb\_obj| + |\Delta fb\_opt - obj - ca|) - |0.16|/(LD\_p \times \Delta\lambda / \Delta LD\_p) \leq |\Delta fb\_ca|.$ --

Signed and Sealed this
Twenty-eighth Day of June, 2011

David J. Kappos
*Director of the United States Patent and Trademark Office*